United States Patent [19]

Geselle et al.

[11] Patent Number: 4,987,872
[45] Date of Patent: Jan. 29, 1991

[54] PROCESS AND DEVICE FOR MONITORING A SET VALUE INDICATOR OF A DRIVE MOTOR OF A MOTOR VEHICLE

[75] Inventors: Helmut Geselle, Backnang; Harald Bühren, Bühl, both of Fed. Rep. of Germany

[73] Assignee: Robert Bosch GmbH, Stuttgart, Fed. Rep. of Germany

[21] Appl. No.: 397,492
[22] PCT Filed: Nov. 17, 1988
[86] PCT No.: PCT/DE88/00714
§ 371 Date: Aug. 10, 1989
§ 102(e) Date: Aug. 10, 1989
[87] PCT Pub. No.: WO89/05907
PCT Pub. Date: Jun. 29, 1989

[30] Foreign Application Priority Data

Dec. 21, 1987 [DE] Fed. Rep. of Germany ....... 3743308

[51] Int. Cl.⁵ .............................................. F02D 41/22
[52] U.S. Cl. .................................... 123/396; 123/399; 180/271
[58] Field of Search .............. 123/396, 397, 399, 320, 123/198 D; 180/271, 284, 282

[56] References Cited

U.S. PATENT DOCUMENTS

| 4,419,973 | 12/1983 | Collonia | 123/396 |
|---|---|---|---|
| 4,660,520 | 4/1987 | Inoue et al. | 123/399 |
| 4,729,354 | 3/1988 | Tominaga et al. | 123/320 |

FOREIGN PATENT DOCUMENTS

| 0076433 | 4/1983 | European Pat. Off. | 180/271 |
|---|---|---|---|
| 0213349 | 3/1987 | European Pat. Off. | |
| 2558477 | 7/1977 | Fed. Rep. of Germany. | |
| 3510173 | 2/1986 | Fed. Rep. of Germany. | |
| 2033623 | 5/1980 | United Kingdom | 180/271 |
| 2133906 | 8/1984 | United Kingdom. | |

Primary Examiner—Andrew M. Dolinar
Attorney, Agent, or Firm—Michael J. Striker

[57] ABSTRACT

A monitoring process for a set value indicator of a drive motor of a motor vehicle which comprises simultaneously monitoring a brake actuation signal and the non-movement of the set value indicator. In case of an error an error in vehicle operation, e.g. the brake is operated but there is a non-movement of the set value indicator because of accelerator blockage, the motor output is reduced to a small value and the vehicle can accordingly be decelerated if e.g. the accelerator pedal is blocked. On the other hand, in accordance with the invention, the safety circuit which decelerates the motor vehicle does not respond if it is detected by means of the movement of the set value indicator that the driver desires an increased motor output, e.g. by detecting an above-threshold value for the time derivative of the set value indicator.

10 Claims, 1 Drawing Sheet

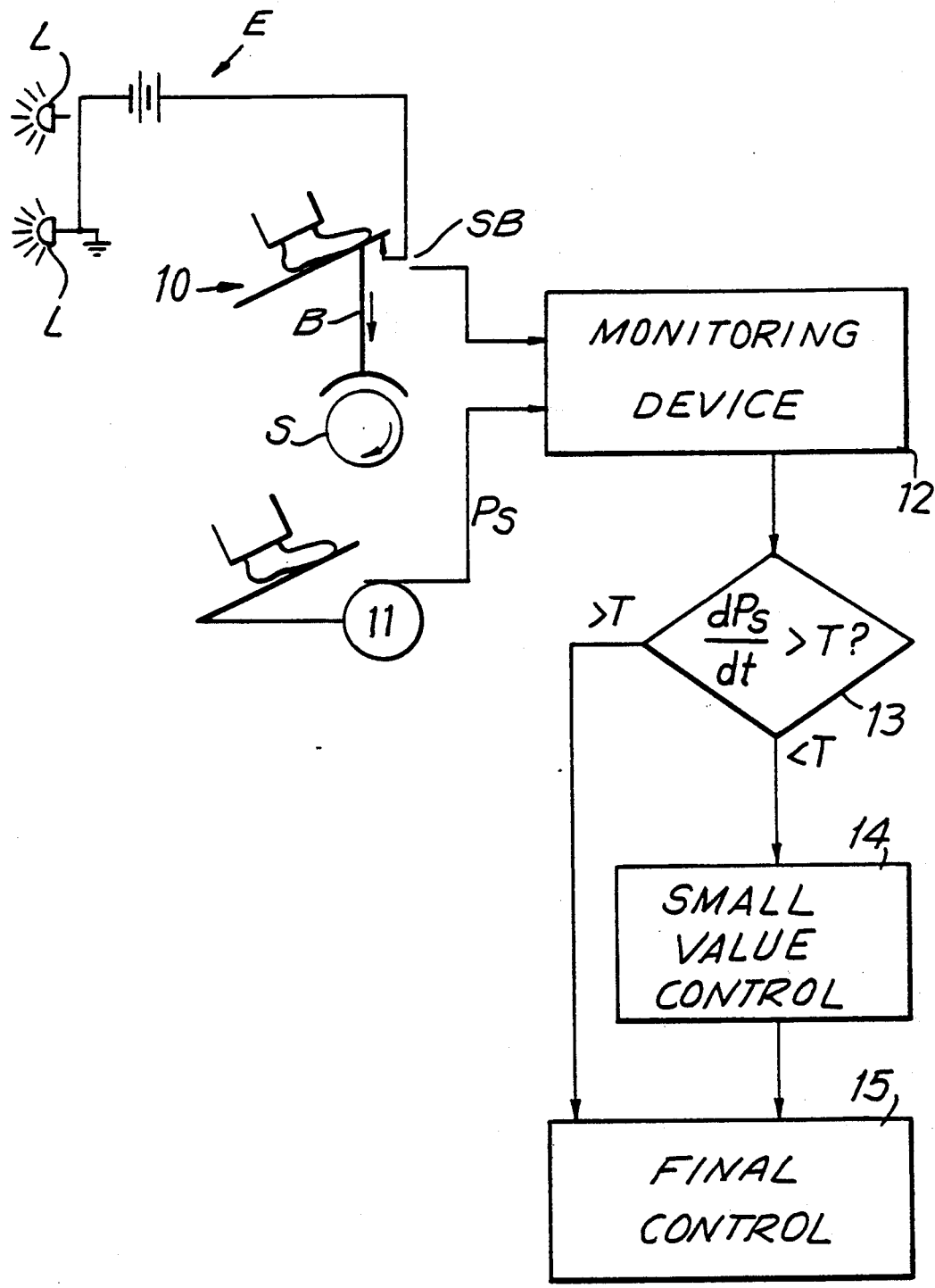

PROCESS AND DEVICE FOR MONITORING A SET VALUE INDICATOR OF A DRIVE MOTOR OF A MOTOR VEHICLE

BACKGROUND OF THE INVENTION

The invention relates to a process and device for monitoring a set value indicator of a drive motor of a motor vehicle which includes a brake system which can provide an actuating signal for the monitoring device and a motor output final control element which may reduce the drive output to a small value when the brake and the motor output set value indicator are actuated simultaneously.

Such a monitoring process is known from DE-OS No. 34 30 077; in this instance, a mechanical switch determines whether or not the accelerator pedal is located outside of the rest position. If a brake actuating signal is present and the accelerator pedal is simultaneously located outside of the rest position, it is assumed that the accelerator pedal is blocked and the motor output is therefore reduced. A further possibility which this system does not handle is described in Kolberg, G., "Electronic Motor Control for Motor Vehicles" in "Journal of Engine Technology", 4, 1985. In this case, when a high pedal value and a brake signal are present simultaneously it is concluded that there is a disturbance and the throttle flap is moved to a lower load position. However, at low outside temperatures the brake signal can last for seconds because of the viscous brake fluid, and starting is therefore made impossible.

Accordingly, it is an object of the present invention to prevent an erroneous blocking set value indication during a monitoring process of the type mentioned above and to prevent faulty drive motor control.

In keeping with these objects and others which will become more apparent hereinafter, the monitoring process for the motor drive output set value indicator includes the step of not reducing motor output or not keeping motor output reduced, when the first derivative of the set value of the motor output according to time is quantitatively greater than a threshold value and the brake actuation signal are simultaneously present. This means that the predetermined output set value is treated as a normal case of operation despite the brake actuation signal.

This process can further comprise reducing the drive motor output by reducing the air flow in the intake pipe or the fuel metering. In some embodiments the motor output can be reduced to or kept at the idling state corresponding to a lower partial load. The brake actuation signal can be obtained electronically preferably from the electric circuit for the brake lights.

Advantageously, however the drive motor output is not reduced only if the first derivative of the motor output set value according to time has a positive value.

The present inventin also includes a device for performing the monitoring process. This device includes a means for forming the first derivative according to time of the motor output set value, for detecting the magnitude of this value and combining it with the brake actuating signal, so that the drive motor output is not reduced when the motor output set value indicator is moved. The motor output set value indicator may be a potentiometer which is actuated by the driver via mechanical means and which transmits the set value as a voltage level. An analog and/or digital electronic unit may be provided to which the set value and the brake actuating signal are fed, which reduces or does not reduce motor output as necessary.

ADVANTAGES OF THE INVENTION

On the other hand, the monitoring process, according to the invention, has the advantage that the first derivative according to time of the set value indicator is evaluated and can therefore take into account the wishes of the driver, also when the pressure drop in the hydraulic system of the brake circulation is not yet complete. In addition, other defects such as a line break from the set value indicator to the regulating device, as well as e.g. breakage of the return spring of the set value indicator, etc., are determined in a reliable manner.

BRIEF DESCRIPTION OF THE DRAWING

An example of the invention is shown in the drawing and explained in more detail in the following detailed description. The single FIGURE is a block diagram showing the process steps of the monitoring device according to our invention.

DETAILED DESCRIPTION OF THE INVENTION

An actuating signal PS of the brake 10 and the output signal of the set value indicator 11 of the drive motor S are fed to the monitoring device 12. In the special case of the embodiment example, the brake actuating signal is transmitted from the electric circuit E for the brake light L, while the set value indicator provides an electric signal for the electronic motor control for the motor vehicle. This monitoring device 12 differentiates at least the set value signal of the motor and makes an inquiry 13 at a threshold value T. In the preferred embodiment, only positive derivatives according to time are taken into account, i.e. the threshold value inquiry only responds when the accelerator pedal is depressed further. If the brake 10 is actuated and the threshold value inquiry does not report any movement at the set value indicator 11 of the motor, the safety circuit responds and the motor output moves to a small value 14 via the air flow in the intake pipe or the fuel metering. This concludes the process 15. According to the invention, however, the safety circuit does not respond inspite of a report of actuation of the brake if the driver (again) depresses the accelerator pedal, which can be determined by means of the differentiated set value signal. The driver can accordingly immediately start and accelerate, respectively, with brake fluid which is cold an therefore viscous.

The small value to which the motor output is reduced can be the idle in the case of the response of the safety circuit. It is unimportant for the invention whether or not the described sequence is realized by electrical means; the accelerator pedal can also be substituted by another suitable device with which the driver can predetermine a set value, e.g. a handle in 2- and 3-wheel motor vehicles.

The motor output set value indicator can comprise a potentiometer which is actuated mechanically and which transmits the motor output set value as a voltage level.

By the "means for generating the brake actuating signal" in the following claims we mean the brake light, the electric circuit for the brake light and the switch "SB" associated with the brake pedal.

It will be understood that each of the elements described above, or two or more together, may also find a useful application in other types of structures differing from the types described above.

while the invention has been illustrated and described as embodied in a process and device for monitoring a set value indicator of a drive motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

We claim:

1. A monitoring process for a drive motor of a motor vehicle having a motor drive output set value indicator and a brake comprising the steps of:
   (a) generating a brake actuation signal when said brake is activated;
   (b) producing a set value signal from said motor drive output set value indicator;
   (c) differentiating said set value signal to form a differentiated set value signal;
   (d) testing whether said differentiated set value signal is quantitatively greater than a threshold value;
   (e) reducing drive motor output of said drive motor unless said differentiated set value signal is greater than said threshold value and said brake actuation signal is being generated; and
   (f) operating said drive motor normally if said differentiated set value signal is positive and greater than said threshold value and said brake actuation signal is being generated.

2. A process according to claim 1 further comprising the step of reducing said drive motor output by controlling fuel metering.

3. A process for a drive motor having an air intake pipe according to claim 1 further comprising the step of reducing said drive motor output by controlling air flow in said air intake pipe.

4. A process according to claim 1, wherein said reducing said motor output proceeds until said motor output corresponds to idling.

5. A process according to claim 1 in which said brake actuating signal is obtained electrically when said brake is actuated.

6. A process for a motor vehicle having an electric circuit with a plurality of brake light for said brake according to claim 10 in which said brake actuating signal is obtained from said electric circuit with said brake lights.

7. A process according to claim 1 in which said operating of said drive motor occurs mormally only if said differentiated set value signal is positive and said brake actuation signal is being generated.

8. A device for monitoring a drive motor of a motor vehicle having a brake comprising a motor output set value indicator connected to said drive motor which produces a motor output set value, means for generating a brake actuating singnall connected with said brake, means for forming a first derivative according to time of said motor output set value from said motor output set value indicator, means for detecting the magnitude of said motor output set value and means for combining said motor vehicle set value with said brake actuating signal so that an output of said drive motor is not reduced when said motor output set value is changed.

9. A device for monitoring according to claim 8 wherein said motor output set value indicator comprises a potentiometer which is actuated mechanically and which transmits said motor output set value as a voltage level.

10. A device for monitoring according to claim 8 further comprising an analog and digital electronic unit to which said motor output set value and said brake actuating signal are fed.

* * * * *